US005903778A

United States Patent [19]

Chang

[11] Patent Number: 5,903,778

[45] Date of Patent: May 11, 1999

[54] METHOD FOR ENABLING TRADITIONAL SCSI PERIPHERAL EQUIPMENTS TO BE COMPATIBLE WITH PLUG-AND-PLAY PROTOCOL

[75] Inventor: Kevin Chang, Tucheng, Taiwan

[73] Assignee: Behavior Tech Computer Corp., Taipei, Taiwan

[21] Appl. No.: 08/876,616

[22] Filed: Jun. 16, 1997

[51] Int. Cl.[6] .............................. G06F 9/00; G06F 13/10

[52] U.S. Cl. .......................... 395/882; 395/500; 395/828; 395/830

[58] Field of Search .................................... 395/500, 882, 395/821, 828, 830

[56] References Cited

U.S. PATENT DOCUMENTS

| | | | |
|---|---|---|---|
| 5,619,724 | 4/1997 | Moore | 395/829 |
| 5,675,831 | 10/1997 | Caputo | 395/830 |
| 5,740,174 | 4/1998 | Somer | 370/402 |
| 5,758,099 | 5/1998 | Grieco et al. | 395/282 |

*Primary Examiner*—Thomas C. Lee
*Assistant Examiner*—Rehana Perveen
*Attorney, Agent, or Firm*—Hedman, Gibson & Costigan, P.C.

[57] ABSTRACT

A method for enabling traditional SCSI peripheral equipment to be compatible with a PLUG-AND-PLAY protocol comprising steps of: selecting an SCSI peripheral device as an object and assigning a predetermined identification number to the selected SCSI peripheral device; periodically detecting the signal status on an SCSI bus so as to change a specific signal level to thus communicate with a host computer which determines whether the assigned identification number is permitted; and delaying a time period during the detection of the signal status on the SCSI bus when the permission to assign an identification number has not been determined, and abandoning the assigned identification number when the same identification number has been found to be used by another SCSI peripheral device.

8 Claims, 4 Drawing Sheets

METHOD FOR ENABLING TRADITIONAL SCSI PERIPHERAL EQUIPMENTS TO BE COMPATIBLE WITH PLUG-AND-PLAY PROTOCOL

BACKGROUND OF THE INVENTION

1. Field of the Invention

The present invention relates to a method for enabling traditional SCSI peripheral equipment to be compatible with a PLUG-AND-PLAY protocol.

2. Description of the Prior Art

The currently small computer standard interface (SCSI) used is provided as a high speed data transmission interface between a computer and its peripheral equipment such as hard disk drives, printers, and so on. The SCSI is characterized in that up to seven peripheral devices are allowed to be connected to a same SCSI bus, i.e., it provides a suitable expansion capability for a computer system, therefore the SCSI is very popular in this field. Normally, a corresponding identification number is manually assigned to each of the peripheral devices. However, the process of assignment can be cumbersome and may even cause errors if two of the peripheral devices are assigned with the same identification number.

For alleviating the above inconvenience and error, the plug-and-play concept is introduced and performed by providing a plug-and-play SCSI protocol by which a specific identification number (ID number) is assigned to a corresponding one of a plurality of plug-and-play type peripheral devices. This will alleviate the inconvenience of manual assignment to the peripheral devices. However, for conventional peripheral devices, the benefit cannot be applied because they are not plug-and-play type peripheral devices. The difference between the conventional peripheral device and the plug-and-play type peripheral device is that the SCSI controller (chip) of the plug-and-play type peripheral device includes an extra built-in structure which can detect an initial plug-and-play signal and transmit this situation to an SCSI controller of a host computer, which in turn executes an SCSI configured automatic operation (SCAM) so as to assign a specific ID number to each plug-and-play type peripheral device. Since conventional peripheral devices are not installed with the specific structure to detect the initial plug-and-play signal, they cannot inform the SCSI controller when they are initially connected to an SCSI bus. It is requisite to provide a new method by which conventional peripheral devices can be enabled to be compatible with the plug-and-play protocol.

SUMMARY OF THE INVENTION

The primary objective of the present invention is to provide a new method for enabling conventional peripheral devices to be compatible with a plug-and-play type SCSI protocol by implementing a new firmware in the SCSI controller of each conventional peripheral device.

In accordance with one aspect of this invention, there is provided a method for enabling traditional SCSI peripheral equipment to be compatible with a PLUG-AND-PLAY protocol comprising steps of: selecting an SCSI peripheral device as an object and assigning a predetermined identification number to the selected SCSI peripheral device; periodically detecting the signal status on an SCSI bus so as to change a specific signal level to thus communicate with a host computer which determines whether the assigned identification number is permitted; and delaying a time period during the detection of the signal status on the SCSI bus when the permission to assign an identification number has not been determined, and abandoning the assigned identification number when the same identification number has already been assigned to another SCSI peripheral device.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 4:
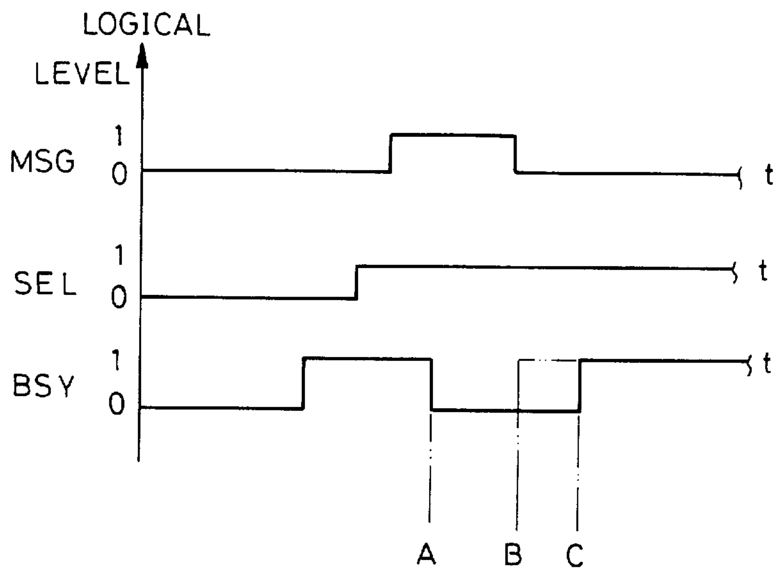
FIG. 4 is a timing schematic for illustrating the SCSI related signals.

Referring to FIG. 4, a timing schematic for illustrating the SCSI related signals is shown, where the upper portion of the timing schematic is used to detect whether there are operational timing signals of conventional peripheral devices. If conventional peripheral devices are detected, ID numbers are respectively assigned to corresponding conventional peripheral devices, afterwhich, the plug-and-play type SCSI peripheral devices are automatically assigned with corresponding ID numbers, i.e. the plug-and-play type SCSI peripheral devices undergo a SCAM operation. Referring to point A of FIG. 4, when the selection signal SEL, the message signal MSG, and the busy signal BSY are respectively in logical high ("1"), high ("1"), and low ("0") status, the controller in the SCSI peripheral device is informed that it is time to automatically assign an ID number. Meanwhile, if the SCSI controller in the peripheral device is so-installed to support the SCAM function, a built-in detecting circuit of the controller will send an interruption signal to inform the CPU in the SCSI controller of the host computer of the initiation of the ID assignment operation. When the message signal MSG is changed to a logical low status (see point B), the plug-and-play type SCSI peripheral device will immediately (within 16 $\mu$s) raise the busy signal BSY to a logical high status in order to meet the SCAM protocol to allow the SCSI controller of the host computer to finish the automatic assignment of a specific ID number to the plug-and-play SCSI peripheral device. However, for conventional peripheral devices, the above signal statuses are not detected and the above operations are not performed during that time interval. Time point C illustrates a situation where the SCSI peripheral device does not support the SCAM protocol, during which time the busy signal BSY remains in a low status for 23 micro seconds after the message signal MSG changes to a low status. The busy signal is not changed to a logical high status until the SCSI controller of the host computer executes this change. Since the logical status change from low to high on the busy signal BSY is determined by the controller of the host computer, a conventional SCSI peripheral device does not respond to the SCAM protocol operation.

Therefore, conventional SCSI peripheral devices can not benefit from the convenience of the plug-and-play function due to incompatibility with the SCAM protocol. This invention provides a firmware to upgrade conventional SCSI peripheral devices to be compatible with the SCAM protocol. Therefore, conventional SCSI peripheral devices can be used in a SCAM protocol system after installation of the firmware of this invention. More specifically, the invention provides a new method by which conventional SCSI peripheral devices can automatically identify assigned ID numbers and inform the controller of the host computer of this identification.

Figure 1:
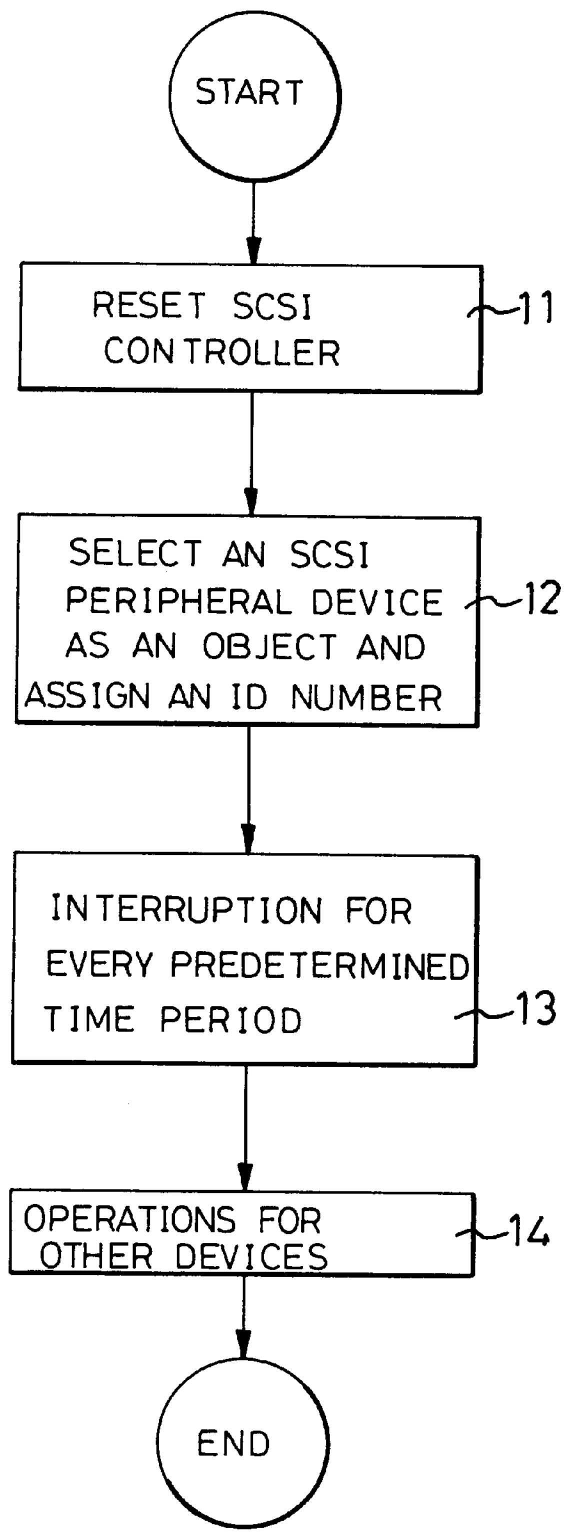
FIG. 1 is a main flowchart used in the present invention.

FIG. 1 is a main flowchart used in the present invention. At step 11, the controller of the conventional SCSI peripheral device is reset. At step 12, the controller of the conventional SCSI peripheral device is specified as an object and assigned with a specific ID number. At step 13, a timer is set to interrupt every 100 μs, i.e., the SCSI bus is detected every 100 μs to determine whether it has entered an automatic ID number assigning status. At step 14, operations for other devices are proceeded.

Figure 2:
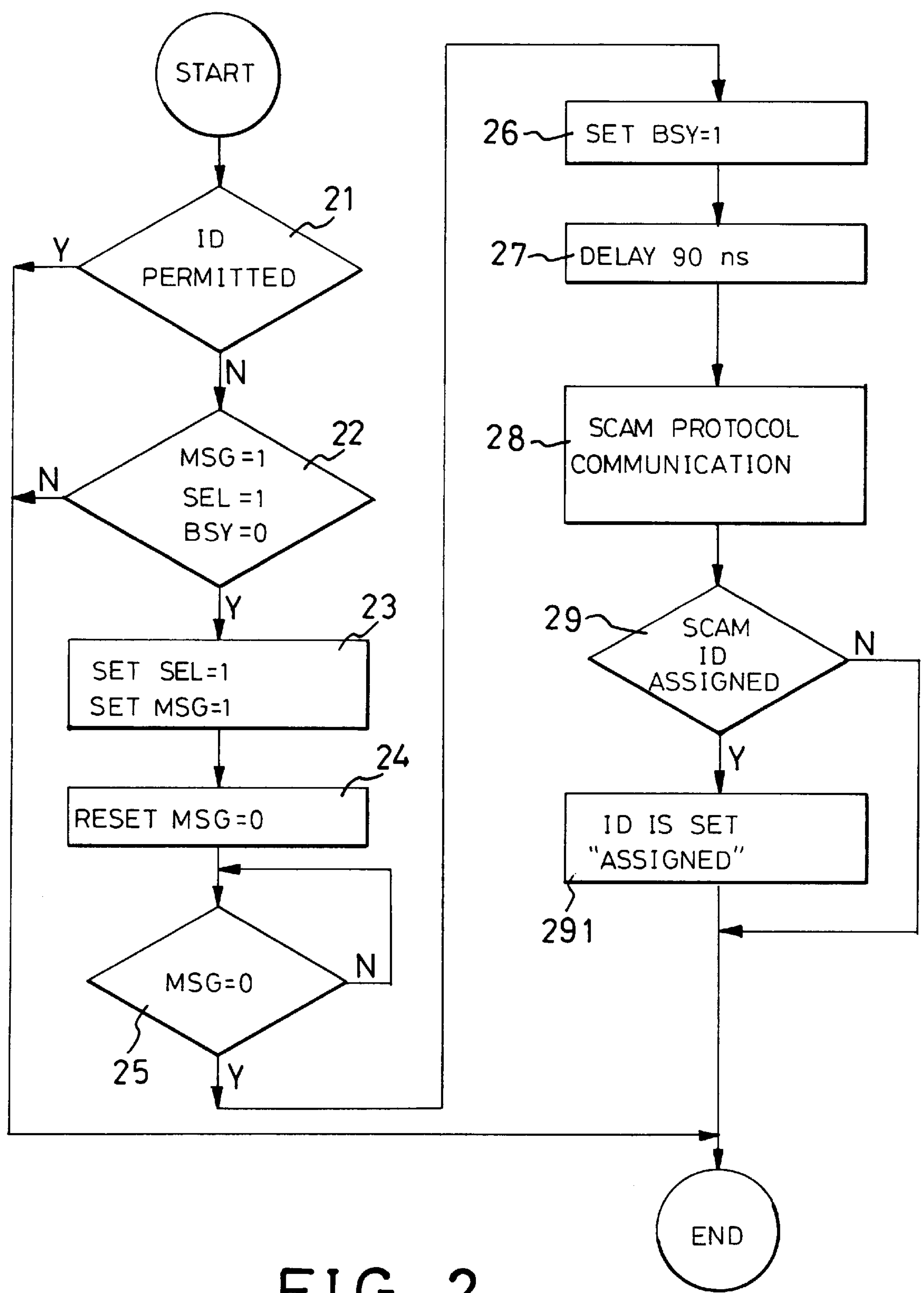
FIG. 2 is a flowchart for a plug-and-play operation in accordance with the present invention.

An interruption flowchart for use at step 13 of the main flowchart to intermittently detect whether the SCSI bus has entered an automatic ID number assigning status is shown in FIG. 2. Initially at step 21, the assigned ID number for the SCSI peripheral device is checked to determine if it is permitted by the controller of the host computer. If positive, the procedure is proceeded to step 14 of the main flowchart. Otherwise, the procedure is forwarded to step 22, where the message signal MSG, the selection signal SEL, and the busy signal BSY are respectively checked against values of "1", "1" and "0". If positive, the procedure is forwarded to step 23 during which the message signal MSG and the selection signal SEL are retained at "1" and fill respectively. Otherwise, the procedure returns to step 14 of the main flowchart. At step 24, the message signal is reset to "0". At step 25, the message signal is checked against values of "0". If positive, the procedure is forwarded to step 26, otherwise the checking step is repeated. At step 26, the busy signal is reset to "1" and the procedure is forwarded to step 27, where a delay time period of 90 ns is performed. At step 28, the subsequent SCAM protocol communication is executed. At step 29, the SCAM ID number is checked to determine if it has been previously assigned. If positive, the ID number is recorded and set as an "assigned" one at step 291 which represents that it has been assigned and it should not be assigned to any other SCSI peripheral device. After step 291, the procedure returns to step 14 of the main flowchart. If the determined result at step 29 is negative, it indicates that the SCAM ID number has not been assigned, and the procedure returns to step 14 of the main flowchart.

In the above interruption flowchart, the SCSI peripheral device is installed with the functions of firstly, detecting and determining the logical statuses of the message signal MSG, the selection signal SEL, and the busy signal BSY, and secondly, promoting the voltage level of the busy signal BSY from low status to high status, so as to simulate the plug-and-play type SCSI peripheral device to support the SCAM protocol. After then, the communication operation of the SCAM protocol is executed between the conventional SCSI peripheral device and the host computer.

Figure 5:
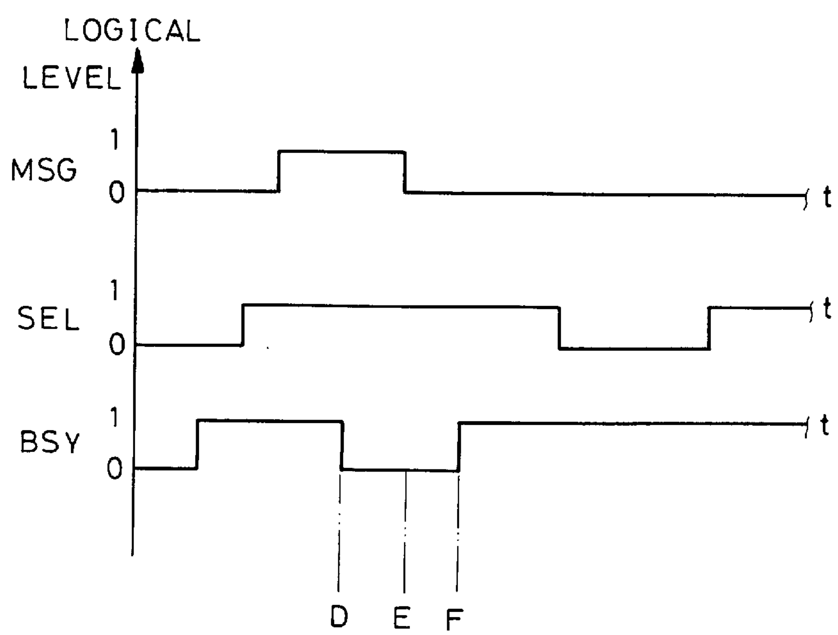
FIG. 5 is a timing schematic for illustrating the SCSI related signals used in the present invention.

With the above installation, the timing relation between the message signal MSG, the selection signal SEL, and the busy signal BSY is shown in FIG. 5, where the D point indicates that the message signal MSG, the selection signal SEL, and the busy signal BSY are respectively in logical "1", "1", and "0". After the message signal MSG is changed from "1" to "0", the peripheral device which has been installed with the firmware of the present invention will promote the busy signal BSY from low to high status in 14 μs, as shown at point F of FIG. 5.

Figure 3:
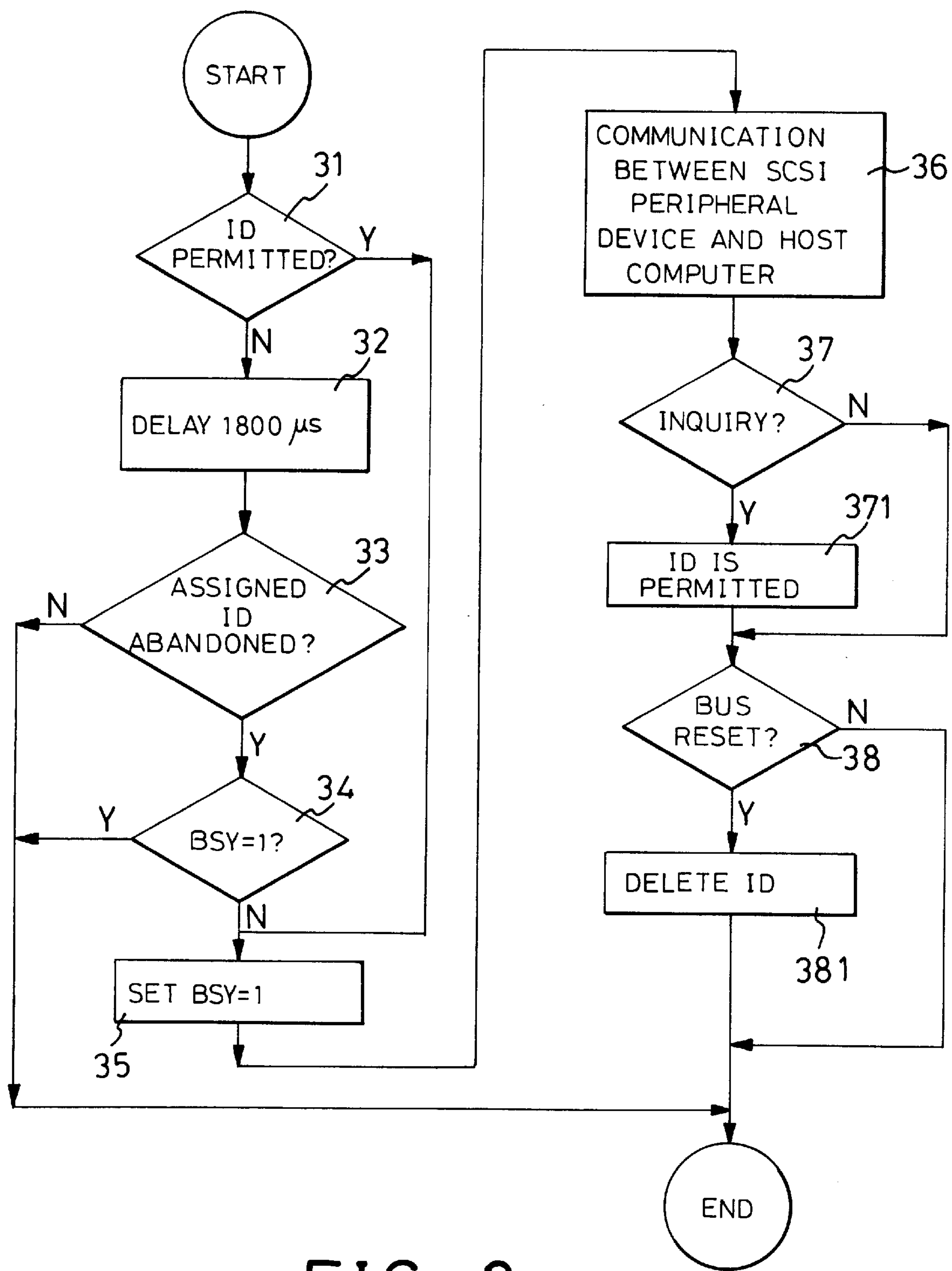
FIG. 3 is a flowchart for interface communication operation in accordance with the present invention.

If an SCSI interruption procedure is to be performed before the ID number set by the SCSI peripheral device is permitted, the related steps in the SCSI interruption procedure are required to be changed in order to avoid conflict between two identical ID numbers. FIG. 3 illustrates an SCSI communication flowchart which introduces a method for avoiding an ID number being assigned to two SCSI peripheral devices. At step 31, the ID number is checked to determine if it is permitted. If positive, the procedure is forwarded to step 35, where the busy signal BSY is set to "1", otherwise, the procedure is forwarded to step 32 to delay for 1800 μs. At step 33, the assigned ID number is checked to determine if it has been abandoned (cleaned). If positive, the procedure is forwarded to step 34, otherwise this procedure is ended. At step 34, the busy signal is checked to determine if it equals "1". If positive, it indicates that the ID number has been assigned to another conventional peripheral device, therefore, the interruption procedure is ended. Otherwise, the procedure is forwarded to step 35, where the busy signal BSY is set to "1".

At step 36, communication between the host computer and the SCSI peripheral device is continued based on the SCSI protocol. At step 37, it is determined if there is an inquiry command to be answered. If positive, the procedure is forwarded to step 371, otherwise to step 38. At step 371, the SCSI ID number is permitted to be set. At step 38, the bus device is detected to determine if it is reset. If positive, the procedure is forwarded to step 381, where the permitted SCSI ID number is deleted then the interruption procedure is ended.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications that may fall within the scope of the appended claims.

I claim:

1. A method for enabling traditional SCSI peripheral equipment to be compatible with a PLUG-AND-PLAY protocol comprising steps of:

selecting an SCSI peripheral device as an object and assigning a predetermined identification number to the selected SCSI peripheral device;

periodically detecting the signal status on an SCSI bus so as to change specific signal level to thus communicate with a host computer which determines whether the assigned identification number is permitted; and delaying a time period during the detection of the signal status on the SCSI bus when the permission to assign an identification number has not been determined, and abandoning the assigned identification number when the same identification number has been found to be used by another SCSI peripheral device.

2. A method as claimed in claim 1, wherein the signal status on an SCSI bus is determined every 100 μs.

3. A method as claimed in claim 1, wherein the delayed time period is 1800 μs.

4. A method as claimed in claim 1, wherein the periodic detecting of the signal status on the SCSI bus comprises a step of firstly detecting whether the identification number has been abandoned and secondly halting the detection on the signal status if the identification number is found to be abandoned.

5. A method as claimed in claim 3, wherein the periodic detecting of the signal status on the SCSI bus comprises a step of firstly detecting whether the identification number has been abandoned and secondly halting the detection on the signal status if the identification number is found to be abandoned.

6. A method as claimed in claim 1, wherein the step of periodically detecting the signal status on an SCSI bus comprises a step of detecting voltage levels of a message signal, a selection signal, and a busy signal, and a step of changing the busy signal from a logical low level to a logical high level in response to a change of the message signal from logical high status to logical low status so as to meet a plug-and-play protocol to thus perform a plug-and-play related communication.

7. A method as claimed in claim 6 further comprising a step of delaying a time period after the busy signal is changed from a logical low level to a logical high level and before the plug-and-play related communication is performed.

8. A method as claimed in claim 7 further comprising a step of determining whether the identification number is permitted or not after the plug-and-play related communication is performed.

* * * * *